No. 692,295. Patented Feb. 4, 1902.
D. J. JARVIS, J. W. WADKIN & T. S. KING.
APPARATUS FOR PROVIDING BARS OR THE LIKE WITH A COVERING OF EXTRUDED MATERIAL.
(Application filed July 16, 1901.)
(No Model.) 3 Sheets—Sheet 2.
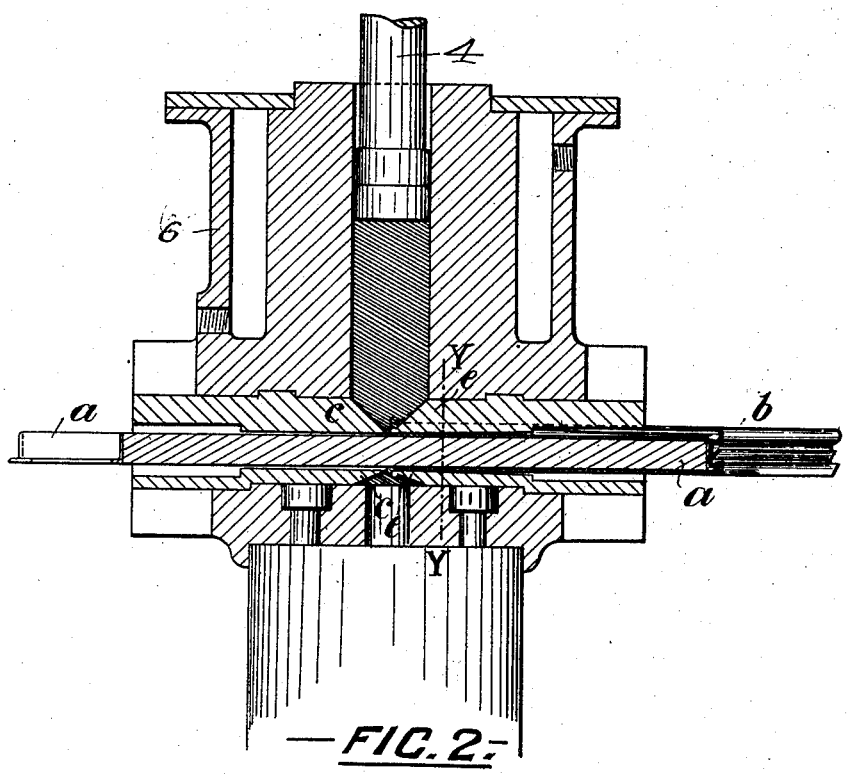
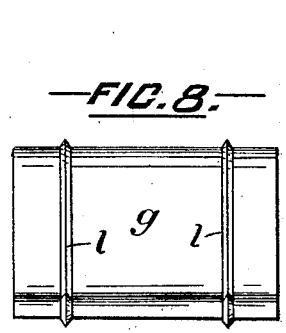
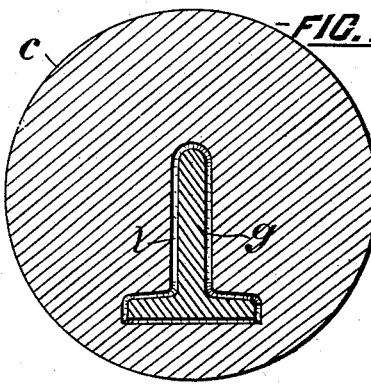
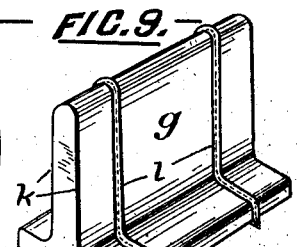

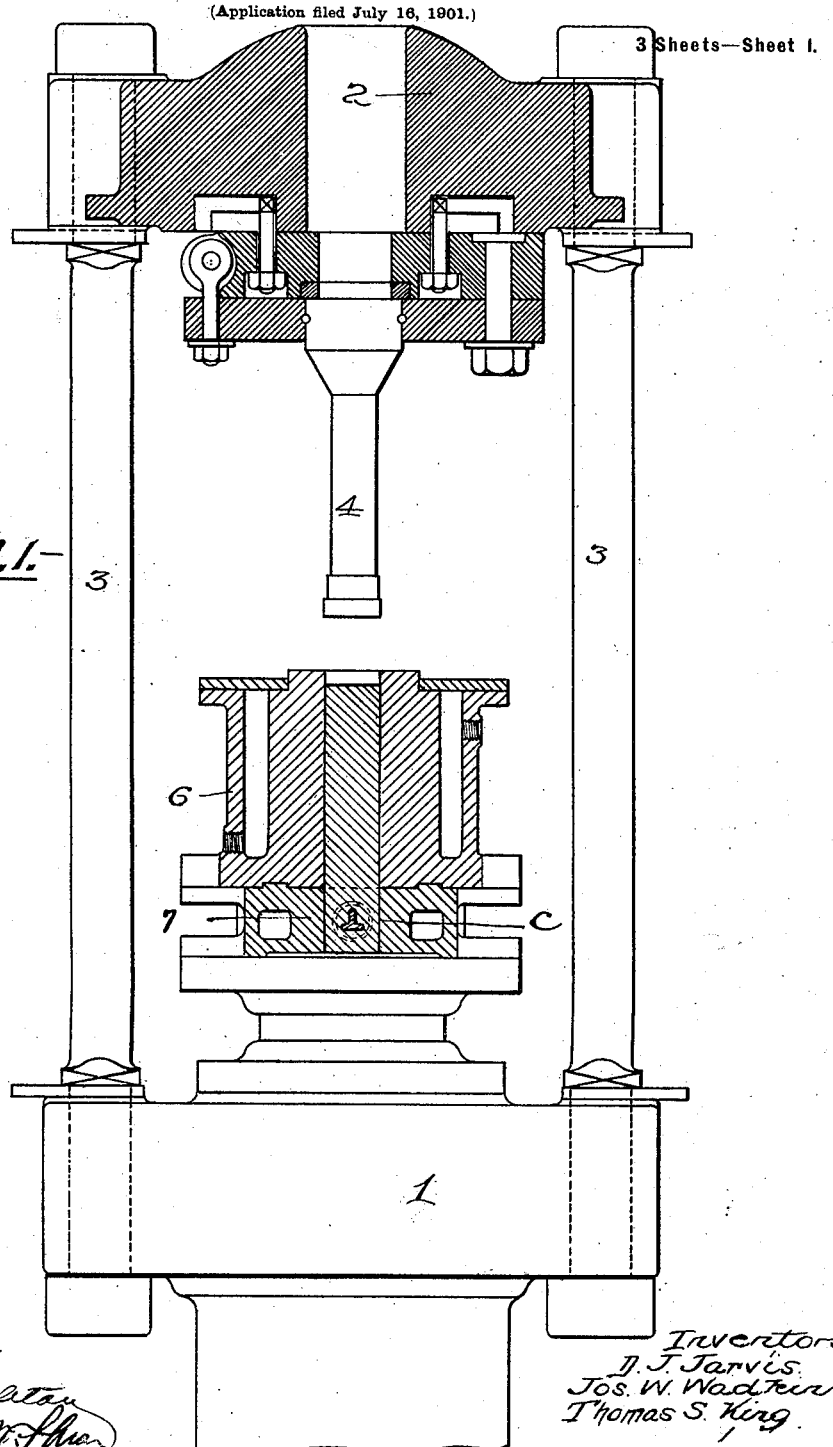

No. 692,295. Patented Feb. 4, 1902.
D. J. JARVIS, J. W. WADKIN & T. S. KING.
APPARATUS FOR PROVIDING BARS OR THE LIKE WITH A COVERING OF EXTRUDED MATERIAL.
(Application filed July 16, 1901.)
(No Model.) 3 Sheets—Sheet 3.
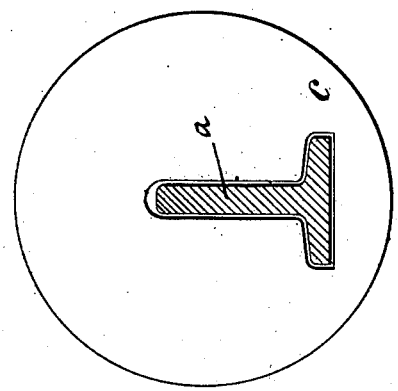
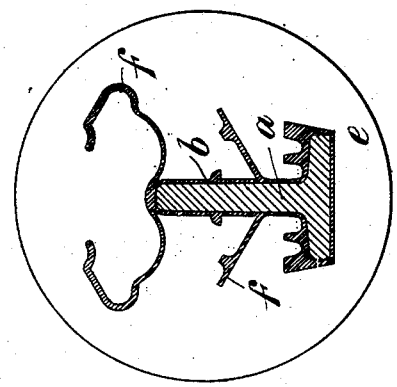
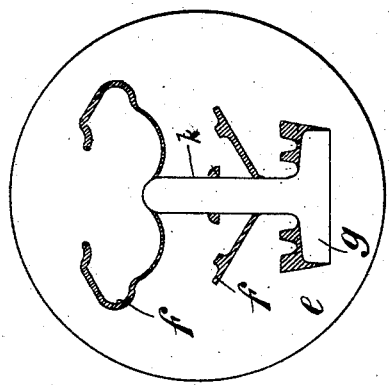
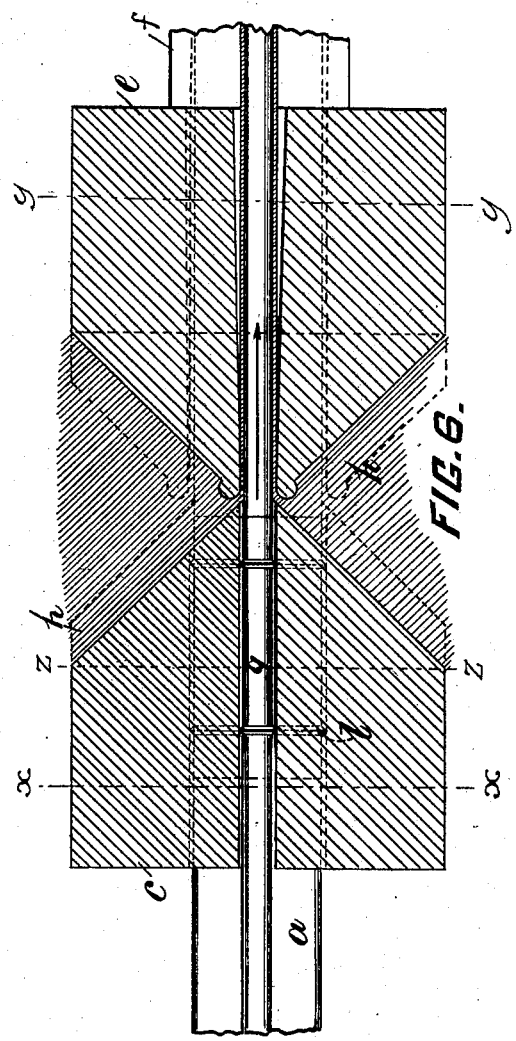
Inventors.
Denzil J. Jarvis
Joseph W. Wadkin
Thomas S. King

UNITED STATES PATENT OFFICE.

DENZIL JOHN JARVIS AND JOSEPH WILLIAM WADKIN, OF LEICESTER, AND THOMAS SCOTT KING, OF COLCHESTER, ENGLAND.

APPARATUS FOR PROVIDING BARS OR THE LIKE WITH A COVERING OF EXTRUDED MATERIAL.

SPECIFICATION forming part of Letters Patent No. 692,295, dated February 4, 1902.

Application filed July 16, 1901. Serial No. 68,500. (No model.)

*To all whom it may concern:*

Be it known that we, DENZIL JOHN JARVIS, manufacturer, residing at Humberstone road, Leicester, in the county of Leicester, JOSEPH WILLIAM WADKIN, engineer, residing at 49 Mere road, Leicester, in the county of Leicester, and THOMAS SCOTT KING, engineer, residing at 8 Old Heath road, Colchester, in the county of Essex, England, subjects of the King of Great Britain and Ireland, have invented certain new and useful Improvements in Apparatus for Providing Bars or the Like with a Covering of Extruded Material, (for which we have made application for Letters Patent in Great Britain, No. 22,780, dated December 13, 1900,) of which the following is a specification.

As the press forms no part of the present invention, we have not shown it in detail in Figures 1 and 2. It comprises a base 1 and head 2, supported by standards 3 3, the head supporting a suitably-operated plunger 4 for operating upon the covering metal contained in the hopper 6, whereby the metal is forced down into the space $h$ (see Fig. 6) between the dies. The hopper 6 surmounts a suitable die-carrier 7, carried on the base and having a horizontal opening into which the dies fit, as indicated in Fig. 1.

This invention relates to improvements in connection with the manufacture of glazing and other bars or other articles, cables, rods, or pipes which are to be covered with extruded lead, lead alloy, or other suitable metal, the object being to provide a method of stopping off or cutting the metal covering at the ends of the bars or the like. We cover the bars with metal by utilizing the actual bar which is to be covered as a core, upon which the plastic metal is to be extruded while passing through the press. By this our improved system we are able to expeditiously and economically cover bars with an envelop or casing of extruded metal at the same operation that the metal envelop itself is formed, so that the bar leaves the press with its plastic or extruded metal envelop rigidly secured thereto. We separate the envelop at the end of one bar from the bar which is to follow it by means of a stopping-off piece having projecting lips thereon which cut the metal envelop from the bar as it passes through, the projections or lips upon the stopping-off piece being of a size over their edges equal to that occupied by the lead-covered bar, so that as the projecting edges pass the extrusion-lips the plastic envelop is cut through all around the bar, except where the extruded lip is not contiguous to the section of the bar.

By this our improved process we are enabled to pass a number of bars continuously through the dies of the press, separating the one from the other by means of a stopping-off piece which parts the bars asunder, while providing that they are entirely covered, except at the ends, with the extruded metal which flows through the dies of the press.

In the accompanying sheet of explanatory drawings, Fig. 1 is a front sectional elevation of a hydraulic press as ordinarily employed for covering bars and other articles with plastic metal. Fig. 2 is a partial side sectional elevation of such press, but on a larger scale than Fig. 1, the bar being shown in position entering and leaving the press. Fig. 3 is a section of a back die taken on the line $x\ x$, Fig. 6. Fig. 4 is a similar section of a front die, being an enlarged section on the line $y\ y$, Fig. 2. Fig. 5 is a similar section taken on the same line, but with the stopping-off piece in position, it being assumed to have just reached the line $y\ y$ in order to show the uncut lead section joining two bars passing through the dies. Fig. 6 is a diagrammatic sectional plan, showing the arrangement of the dies and bars with the stopping-off piece passing through the back die. Fig. 7 is a section of the back die on the line $z\ z$, Fig. 6, showing the stopping-off piece in cross-section. Figs. 8 and 9 are respectively side elevation and perspective views of the stopping-off piece.

In carrying our invention into effect in connection with the method of manufacturing metal-covered bars we employ a hydraulic press, such as shown in Fig. 1, having guiding and other dies provided thereupon through which the bar $a$ to be covered is passed, the metal which has been introduced in the cylinder through which the bars pass being forced by means of a moving ram or rams to cover the bars traveling through, and thus to form a protecting envelop of metal about the inner bar or core. The bar entering is shown at $a\ a$ in Fig. 2 and leaving covered with metal, as shown in $b$, Fig. 2. We make the back or initial die $c$, as shown in Fig. 3, with a space to receive the bar as it passes through and having a clearance all around the bar equal to the thickness of the envelop of metal which is to be extruded over the bar. On the opposite side of the press we arrange our final die $e$, in which we form a space equal to the space to be occupied by the bar $a$ and the metal covering $b$, which is to be extruded thereon, so that as the bar is passed through the final die the space not filled by the bar is caused to be filled by the plastic metal which is urged therein by the moving cylinder or press-rams. The bar is thus covered and has provided upon it lead flaps or extensions $f$, as determined by the shape and form of the opening made within the die. The position of the dies $e\ c$ is indicated in Fig. 6, and the plastic metal is urged from the spaces $h$ to cover the bar $a$ as it passes through in the direction indicated by the arrow. On the ends of the bar we introduce a stopping-off piece $g$, as shown in Fig. 5, or an intermediate length of bar of the same size on its outer surface $k$ as the unclothed or uncased bar and having projections or ribs $l$ formed thereon, which are of the same size on their outer surface or edges as the extruded envelop on the bar after it has passed through the dies, so that when this stopping-off piece passes through the back or initial die $c$ the whole of the space forming the actual opening of the die is occupied by the projecting pieces on the distance-piece when passing through, and when such distance-piece passes through the outer or finishing die $e$, as shown in Fig. 5, it fills that space, leaving only sufficient space in the die to serve as connecting members $b\ f$ to make a continuation of the extruded metal from one bar length to the other where such extraneous flaps exist. Otherwise the envelop is entirely cut and the bars entirely separated by the cutting edges. Thus when the bar or other article, with its stopping-off piece and its connected bar or member, is urged through the dies the issuing bar from the press is covered with metal over its entire surface, while the continuity of the metal from one bar to the other or from one member to the other is preserved by means of the spaces not completely filled by the stopping-off piece when such is passing through the final die where such spaces extraneous to the bar exist. We make the length of our stopping-off piece to suit any particular requirement, and we modify the shape to suit the section and type of tube, cable, rod, or other article to which it is to be connected, varying the method of jointing to suit the section and form of the bar, rod, or other article which is to be operated upon.

We do not limit the application of our invention to any particular form of press or to any special means for feeding the bars or other articles through the dies of the press.

Having thus described our invention, what we claim as new, and desire to secure by Letters Patent, is—

1. In combination with a press for covering metal bars, tubes, cables, and other articles with extruded or plastic metal, a stopping-off or distance piece, which is placed between the lengths of such bars, tubes, cables or other articles for passing through the press-dies, substantially as hereinbefore described.

2. In combination with a press for extruding an envelop of metal over a bar or the like, a stopping-off piece comprising a short bar of the same cross-section as the bar to be covered and laterally-projecting cutting edges at or near the opposite ends thereof, substantially as described.

In witness whereof we have hereunto set our hands in the presence of witnesses.

DENZIL JOHN JARVIS.
JOSEPH WILLIAM WADKIN.
THOMAS SCOTT KING.

Witnesses to the signatures of the said Denzil John Jarvis and Joseph William Wadkin:
 WALTER W. BALL,
 F. HOOD.
Witnesses to the signature of the said Thomas Scott King:
 MAURICE G. PLANE,
 JAMES CHIPRELL.